United States Patent [19]

Hayes

[11] Patent Number: 4,955,719
[45] Date of Patent: Sep. 11, 1990

[54] INTERFEROMETER WITH THIN ABSORBING BEAM EQUALIZING PELLICLE

[75] Inventor: John B. Hayes, Tucson, Ariz.
[73] Assignee: Wyko Corporation, Tucson, Ariz.
[21] Appl. No.: 282,473
[22] Filed: Dec. 9, 1988
[51] Int. Cl.⁵ ............................. G01B 9/02; G01B 5/22
[52] U.S. Cl. ..................................... 356/359; 350/314
[58] Field of Search ................ 356/359, 360; 350/311, 350/314

[56] References Cited

U.S. PATENT DOCUMENTS 3,998,553  12/1976  Hunter et al. ..................... 356/109
4,820,049  4/1989  Biegen .............................. 356/360

OTHER PUBLICATIONS

Electro–Optical Systems Design, Aug. 1970, "Solving Design Problems with Pellicles", by Schwartz, Milton J., pp. 870–877.
Melles Griot, "Pellicle Beamsplitters", pp. 13-10 to 13-11.
Applied Optics, vol. 12, No. 9, Sep. 1973, "Wavelength Dependent Transmission of a Pellicle Beam Splitter Used in a Ratio Reflectometer" by T. Saito and M. Wetzel, pp. 2020-2021.
Applied Optics, Mar. 1971, vol. 10, No. 3, "Pellicle for 10.6μ", pp. 663-665, by A. Layton, D. Contini, and T. Bayston.
Applied Optics, Jan. 1970, vol. 9, No. 1, "Absolute Specular Reflectance Measurements of Highly Reflecting Optical Coatings of 10.6μ", by D. Kelsall, pp. 85-90.

Primary Examiner—Davis L. Willis
Assistant Examiner—Matthew W. Koren
Attorney, Agent, or Firm—Cahill, Sutton & Thomas

[57] ABSTRACT

An interferometer includes a thin, absorbing pellicle in the path of a test beam to attenuate the test beam so that its intensity is approximately equal to the intensity of a reference beam. The pellicle reflects less than about six percent of the test beam, thereby avoiding spurious reflections that produce spurious fringes.

14 Claims, 2 Drawing Sheets

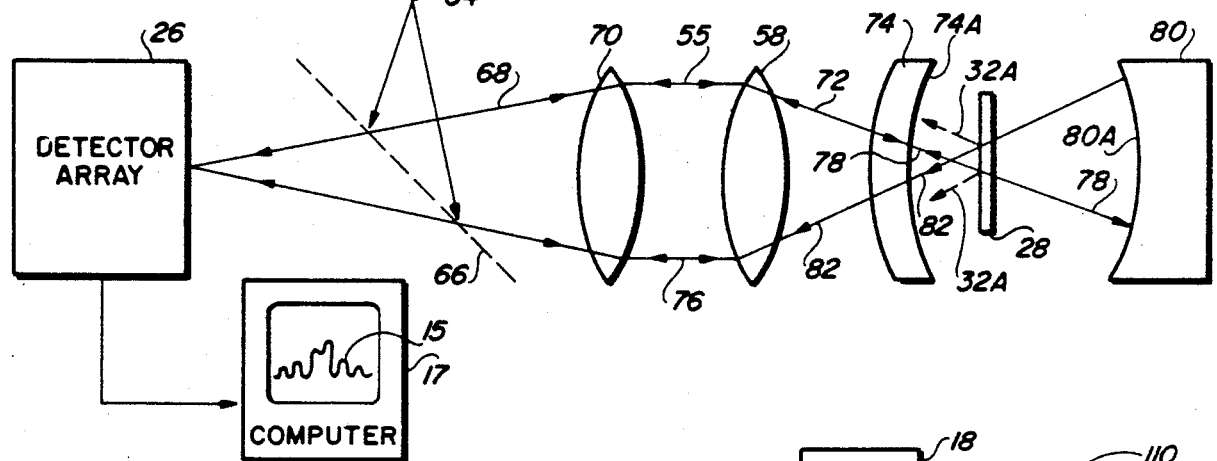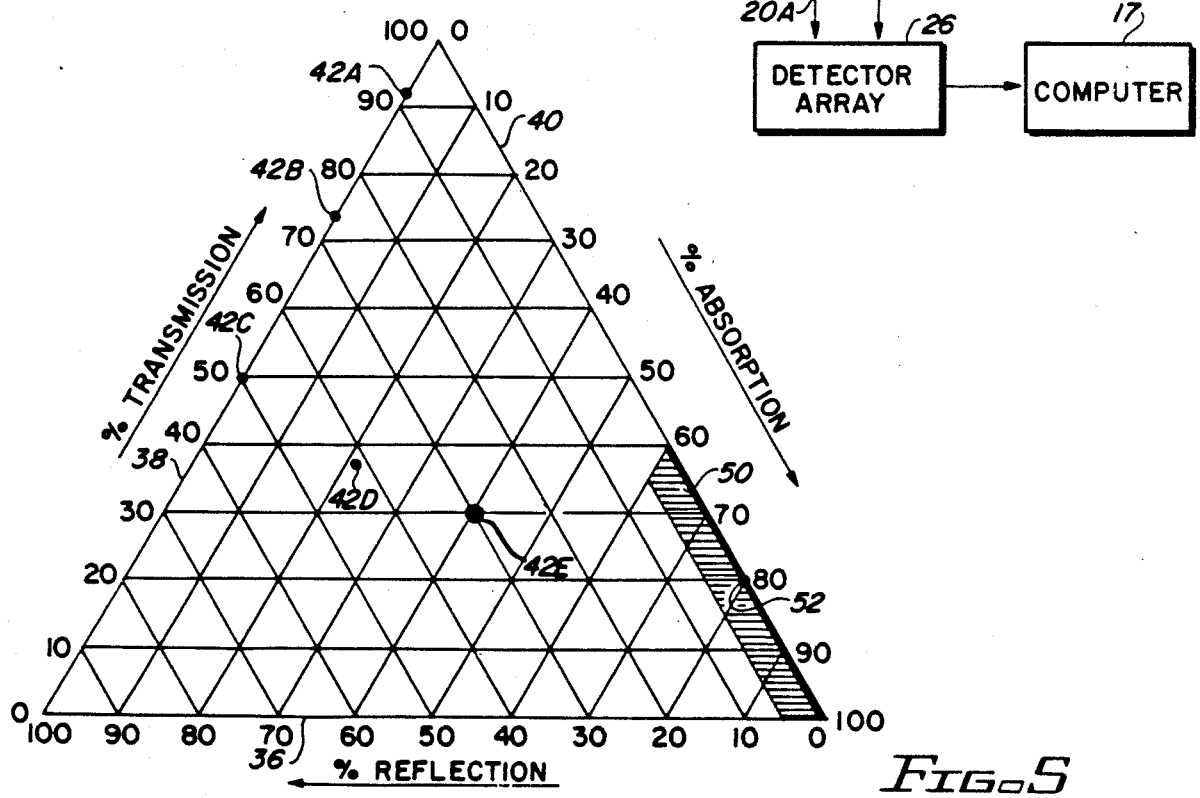

INTERFEROMETER WITH THIN ABSORBING BEAM EQUALIZING PELLICLE

BACKGROUND OF THE INVENTION

The invention relates to an interferometer including a thin, absorbing attenuator in the path of a test beam to balance optical intensities of the test beam and an interfering reference beam, thereby producing distinct interference fringes and reducing effects of spurious reflections.

Interferometers produce interference fringes representing contours of a test surface, as a result of interference between a light beam reflected from a known reference surface and a light beam reflected from a test surface. It is well known that contrast of the interference fringes is inadequate if the intensity of the beam reflected from the test surface does match the intensity of the beam reflected from the reference surface. For a Twyman-Green interferometer, it frequently is necessary for a user to maintain an inventory of expensive reference surfaces of various reflectivities to match the reflectivities of a broad range of test surfaces that may need to be measured. For computerized phase measurement systems, it is necessary to have cosinusoidal fringes. In a Fizeau interferometer, if the test surface is of higher reflectivity than the reference surface, it is necessary to attenuate the test beam to maintain the cosinusoidal fringes.

U.S. Pat. 3,998,553 (Hunter et al.) discloses a spherical wavefront Fizeau interferometer that utilizes a commercially available metal coated pellicle located between the reference surface and the test surface to balance the intensity of a test beam with that of a reference beam before allowing interference between them. Unfortunately, the metal coated surface of the pellical may produce spurious reflections that may interfere with the computerized measurement of the interference pattern. More specifically, the spurious reflections may produce indeterminate gaps or "holes" in the data representing the shape of the computer-calculated wavefront returned from the test surface. FIG. 1 illustrates a typical fringe pattern having fringes such as 9A, 9B, and 9C to be measured by a computerized interferometer. Reference numeral 11 designates a large erroneous "spike" in the fringe intensity profile data, causing inaccurate phase measurements. The coated pellicle can be tilted to avoid effects of the stray reflections, but such tilting is undesirable because for large spherical test surfaces there may not be enough available space in the interferometer setup to allow the needed tilting of the pellicle. The manufacturing yield of commercially available coated pellicles is lower than desirable and the number of steps required for their manufacture is higher than desirable, leading to unnecessarily high cost.

Thus, there is an unmet need for an improved interferometer that avoids the problems caused by prior reflective coated pellicles utilized to balance the intensity of a test beam with a reference beam.

SUMMARY OF THE INVENTION

Accordingly, it is an object of the invention to provide an interferometer capable of producing computer-enhanced profiles of highly reflective test surfaces, especially spherical test surfaces, which are free of indeterminate data caused by spurious reflections from a pellicle used to balance the intensity of a reflected test beam with the intensity of a reference beam.

It is another object of the invention to provide an interferometer in which there is no need to tilt a pellicle in the path of a test beam to avoid spurious reflections.

It is an object of the invention to provide an interferometer that reduces indeterminate data in computer-enhanced surface profiles caused by spurious reflections from coated pellicles of the prior art.

It is another object of the invention to provide an attenuator which reflects only a small amount of a test beam in order to minimize spurious reflection of an interferometer test beam.

It is another object of the invention to provide an uncoated, absorbing pellicle which is more easily manufactured and less expensive than the coated pellicles of the prior art.

Briefly described, and in accordance with one embodiment, the invention provide an interferometer producing an initial beam of light that is separated into a reference beam and a test beam. A test element reflects the test beam. A thin absorbing attenuator is located in the path of the test beam, and attenuates the test beam so that its intensity matches the intensity of the reference beam. The attenuator reflects less than about ten percent of the test beam, and preferably less than six percent. In the described embodiments of the invention, the attenuator is a dyed, uncoated pellicle. The dye is distributed uniformly in a plastic film of which the pellicle is composed and absorbs approximately 50% to 80% of any beam as that beam passes through the pellicle, while reflecting less than about six percent of the beam. The pellicle has a thickness small enough that it introduces aberration of no more than approximately one-eighth of a wavelength into a wavefront of an F/1 beam, and in the described embodiments of the invention, has a thickness of approximately two microns. The described embodiments include utilization of the dyed, low reflectivity, absorbing pellicle in planar and spherical Fizeau interferometers and in a planar and spherical Twyman-Green interferometer.

BRIEF DESCRIPTION OF THE DRAWINGS

FIG. 3 is a schematic diagram of a spherical Fizeau interferometer.

FIG. 4 is a schematic diagram of a planar Twyman-Green interferometer.

FIG. 5 is a graph useful in comparing the present invention with the prior art.

DETAILED DESCRIPTION OF THE PREFERRED EMBODIMENTS

Figure 2:
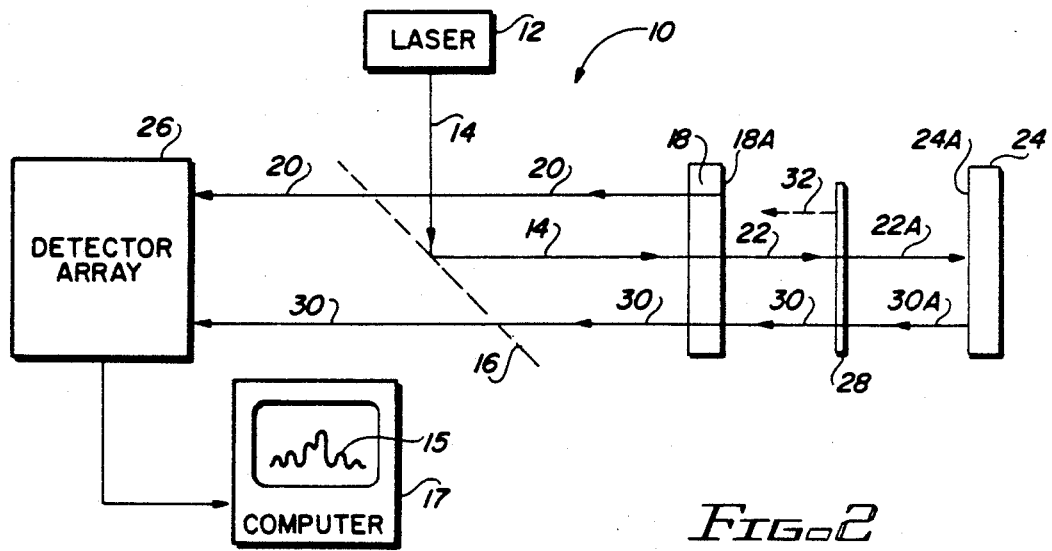
FIG. 2 is a schematic diagram of a planar Fizeau interferometer.

Referring to FIG. 2, Fizeau interferometer 10 includes a laser 12 that produces a collimated beam 14. Laser 12 can be a helium-neon gas laser that operates with a wavelength of 6328 Angstroms. Beam 14 is reflected by a partially reflective, partially transmissive mirror 16 onto a flat reference surface 18A of a partially reflective, partially transmissive reference element 18. Part of beam 14 is reflected by reference surface 18A to produce a reference beam 20 that impinges upon a detector 26. The rest of beam 14 is transmitted by reference element 18 to produce test beam 22. Test beam 22 passes through an uncoated, thin, low reflectivity, absorbing pellicle 28 to a test surface 24A of a test article 24. A small spurious portion less than ten percent, and preferably less than six percent, of test beam 22 is reflected by the left hand surface of pellicle 28, as indicated by dotted line arrow 32.

The interference pattern produced at detector 26 can be supplied to a suitable computerized image analysis system 17 to produce a fringe pattern 15 (better illustrated in FIG. 1) from which the profile of test surface 24A can be computed by a suitable phase-measuring surface reconstruction algorithm.

Reference numeral 22A designates the portion of test beam 22 that has passed to the right of attenuator 28. Beam 22A is reflected by highly reflective test surface 24A to produce reflected beam 30A, which then is further attenuated by pellicle 28 to produce attenuated test beam 30. Attenuated test beam 30 is transmitted by reference element 18 and interferes with reference beam 20 to produce an interference pattern at detector 26.

In accordance with the present invention, pellicle 28 is a thin, dyed, low reflectivity, uncoated pellicle which uniformly attenuates the test beam primarily by absorbing energy from it. The surface of pellicle 28 reflects less than ten percent, and preferably less than about six percent of test beam 32. As an example, when testing a highly reflective test article, pellicle 28 should absorb about seventy-five percent of the light of test beam 22 to produce beam 22A. Beam 22A is reflected by test surface 24A to produce beam 30A. Pellicle 28 then absorbs about seventy-five percent of beam 30A to produce attenuated test beam 30, the intensity of which then is about four percent of that of beam 22. Thus, pellicle 28 attenuates enough of test beam 22 to cause the intensity of reflected test beam 30 to closely match the intensity of reference beam 20, so that fringes of the interference pattern at detector 26 will have high contrast.

The thickness of pellicle 28 should be small enough that it produces no aberration larger than about one-eighth of a wavelength into an F/1 spherical beam, wherein F/1 is the ratio between the total length and the diameter of a lens producing the beam from a collimated source. The range of practical wavelengths is from 0.3 to 1.0 microns. Pellicle 28 is less than five microns thick, and preferably is less than two microns thick, to minimize distortion of a wavefront transmitted thereby.

The high absorptivity and low reflectivity of pellicle 28 greatly reduces spurious reflections from pellicle 28 and thereby reduces corresponding spurious fringes in the interference pattern at detector 26. Such reducing of the spurious reflections substantially reduces the large abnormal spike 11 in the fringe data 15 of FIG. 1. Spike 11 results in a saturated signal at detector 26. (The saturation level is indicated by numeral 34 in FIG. 1.) Such saturated signal levels make it difficult for the surface calculation algorithm to properly reconstruct the shape of the surface.

FIG. 3 illustrates a spherical Fizeau interferometer 60 in which laser 12 produces a beam 14 that is focused by lens 62 to produce a converging spherical wavefront 64. Wavefront 64 is reflected by a partially reflective, partially transmissive beam splitter 66 to produce a diverging spherical wavefront 68. Lens 70 focuses wavefront 68 to produce a collimated beam 55. Lens 58 focuses collimated beam 55 to produce a converging spherical wavefront 72. Part of wavefront 72 is transmitted by a partially transmissive, partially reflective spherical reference element 74 to produce a spherical converging test beam 78. The rest of wavefront 72 is reflected by spherical reference surface 74A, producing spherical reference beam 76.

Figure 1:
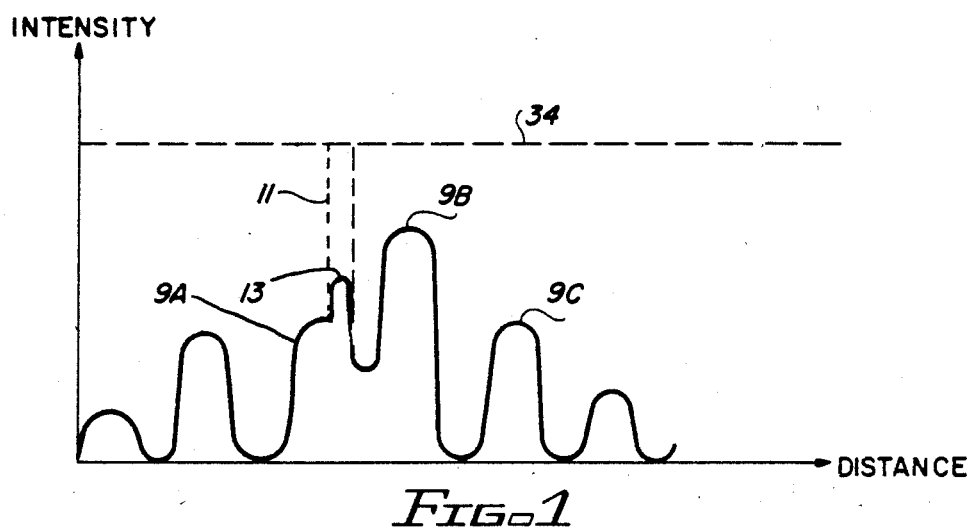
FIG. 1 is a graph useful in describing a problem of the prior art.

Converging test beam 78 passes through uncoated, low reflectivity, absorbing pellicle 28 and impinges on a spherical test surface 80A of a spherical test element 80. (Pellicle 28 in FIG. 3 can be identical to pellicle 28 of FIG. 2.) Less than about ten percent of test beam 78 is reflected by the left hand surface of pellicle 28, as indicated by dotted line arrows 32A, producing a low level of spurious reflections. The large spike 11 of FIG. 1 is thereby avoided.

Spherical test surface 80A reflects test beam 78 back through pellicle 28, producing attenuated test beam 82, which is transmitted to the left through reference element 74 for interference with spherical reference beam 76.

Figure 3A:
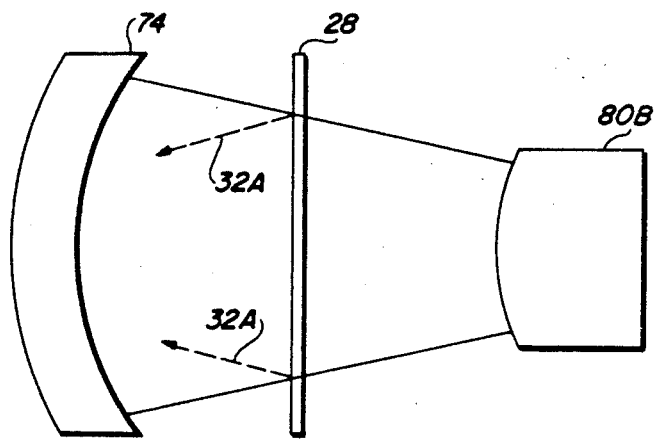
FIG. 3A is a schematic diagram of a portion of a spherical Fizeau interferometer configured to measure a convex spherical test surface.

FIG. 3A shows a part of interferometer 60 of FIG. 3 with a convex spherical test element 80B instead of concave spherical test element 80. It can be seen that the diameter of pellicle 28 must be greater than that of test element 80B. As a practical matter, the diameter of pellicle 28 may be greater than about six inches.

It should be noted that lens 58 in FIG. 3 can produce either a converging or diverging beam, respectively, from beam 55.

FIG. 4 represents a planar Twyman-Green interferometer 110 in which laser 12 produces collimated beam 14. Part of beam 14 is transmitted by partially transmissive, partially reflective beam splitter 112, to produce test beam 22. The remainder of beam 14 is reflected by beam splitter 112, producing reference beam 20, which is reflected by reference surface 18A of reference element 18. Following reflection by reference surface 18A, reflected reference beam 20A is transmitted by beam splitter 112 to detector 26.

Thin, optically uniform, absorbing pellicle 28 is located in the path of test beam 22. Test surface 24A of test element 24 reflects test beam 22 for interference with reflected reference beam 20A. Pellicle 28 produces attenuated test beam 30 by absorbing most of test beam 22 as previously explained. Attenuated test beam 30 is reflected by beam splitter 112 to detector 26, to produce an interference pattern. As in the embodiments of FIGS. 2 and 3, the Twyman-Green interferometer of FIG. 4 avoids the spike 11 in FIG. 1 due to spurious reflections from pellicle 28.

The interferometers of FIGS. 2-4 are superior to the interferometer described in the Hunter reference because of the different optical properties of the non-coated, absorbing pellicle 28. The different optical properties result in the needed high attenuation of the test beam with low spurious reflections. The need for tilting of the pellicle to reduce spurious reflections is avoided. Since the value of the computed phase is determined by the vector sum of the electric field vectors of the spurious reflections and the interfering beams that produce the fringe pattern, large levels of spurious reflections can produce large computed phase errors. The above described reduction of the spurious reflections achieved by the present invention therefore results in more accurate OPD calculations. The elimination of the metallic coating of the Hunter pellicle may reduce the likelihood of introducing additional aberration.

The differences in such optical properties can be best understood by referring to FIG. 5. FIG. 5 is a three-variable graph of the optical properties of transmission, reflection, and absorption of a reflective, transmissive, and/or absorptive element. More specifically, axis 36 represents reflectivity of such an element. Axis 38 represents the transmissivity of pellicle 28 and axis 40 represents its absorptivity.

Points 42A, 42B, 42C on axis 38 designate commercially available pellicles which have essentially zero percent absorptivity at a wavelength of 6328 Angstroms. Point 42A indicates the properties of an uncoated pellicle manufactured by National Photocolor Corporation (NPC Corp.) of Mamaroneck, New York. Point 42B indicates the properties of an NPX-4 coated pellicle manufactured by NPC Corp., and point 42C designates an NPX-9 coated pellicle by NPC Corp. Point 42D represents a commercially available coated NP-40 pellicle manufactured by NPC Corp. having an absorptivity of approximately twenty-two percent, a reflectivity of approximately forty-one percent, and a transmissivity of approximately thirty-seven percent at a wavelength of 6328 Angstroms. Point 42E represents a coated NPIN-30/30 pellicle manufactured by NPC Corp. having a absorptivity of forty percent, a reflectivity of thirty percent, and a transmissivity of thirty percent at a wavelength of 6328 Angstroms.

The range of absorptivity, reflectivity, and transmissivity of uncoated, absorptive pellicles in accordance with the present invention is indicated in cross-hatched area 50 of FIG. 5, wherein the absorptivity is greater than approximately sixty percent, the reflectivity is less than about six percent, and the percent transmission is in the range from zero to forty percent. When used with a transmission element that has a reflectivity of 4%, a "perfect" pellicle for the above described embodiments would have the reflectivity, transmissivity, and twenty-one percent absorptivity indicated by point 52. For different percent transmission requirements, point 52 would lie along thickened line 53 in FIG. 5 for a "perfect" pellicle.

Pellicle 28 can be manufactured using techniques similar to those used in the initial stages of manufacture of typical prior art coated pellicles. The process is generally described in "Solving Design Problems With Pellicles", by Schwartz, Electro-Optical Systems Design, August, 1970. Briefly, the process of manufacture involves dissolving a polymer in a suitable solvent, adding a plasticizer, pouring the mixture onto a still water surface, and allowing the solvent to evaporate, producing a thin, uniform film. The water soaked film is stretched over a flat edged frame. When the film dries, the pellicle remains. After the pellicle is formed it is coated with a metallic or dielectric coating. The coating step is very difficult and costly, resulting in high costs for coated pellicles.

In contrast to the prior art, a suitable dye is added to the mixture of polymer and plasticizer before pouring it onto the water surface to make the absorbing pellicle 28 of the present invention. Dyes are colored substances capable of absorbing radiation. When the dye is added to the polymer mixture, the dye molecules intermingle in a homogeneous solution with long polymer molecules, forming chemical bonds of various strengths. A variety of dyes can be used with pellicle 28, for example, nigrosines, indulines, acetate dyes, azo disburse dyes, anthraquinone disperse dyes, or diphenylamine disburse dyes. Although the dye can have any color, it is only necessary that it absorb the correct amount of test beam at the desired wavelength.

Dyed pellicles prepared in this manner are not analogous to the prior art coated pellicles. As described above, the coating step is an entirely separate procedure that follows drying of the pellicles on the frames. In the dyed pellicles, the absorbing material is an intrinsic part of the polymer matrix forming the structure of the pellicle. In the prior coated pellicle, the absorbing material is not an intrinsic part of the polymer matrix forming the structure of the pellicle.

While the invention has been described with reference to several particular embodiments thereof, those skilled in the art will be able to make the various modifications to the described embodiments without departing from the true spirit and scope of the invention. For example, the spurious reflections 32A could be reduced even further by providing an anti-reflective coating on the described dyed, absorbing pellicle.

What is claimed is:

1. An interferometer, comprising in combination:
   (a) means for producing an initial beam;
   (b) means for separating said initial beam into a reference beam and a test beam;
   (c) a test element which reflects said test beam;
   (d) a thin, absorbing attenuator located in said test beam, said attenuator reflecting less than about ten percent of said test beam and attenuating said test beam so that its intensity is approximately equal to the intensity of said reference beam, said attenuator including a dyed pellicle;
   (e) means for interfering said reference beam and said attenuated test beam to produce a fringe pattern representing differences between said test beam and said reference beam.

2. The interferometer of claim 1, wherein the means for separating said initial beam into a reference beam and a test beam includes a partially reflective and partially transmissive reference element which produces a reference beam by reflecting part of said initial beam and produces a test beam by transmitting part of said initial beam.

3. The interferometer of claim 1 wherein said pellicle is capable of absorbing more than about fifty percent of said test beam, thereby reducing the intensity of said test beam to an intensity approximately equal to the intensity of said reference beam.

4. The interferometer of claim 3 wherein said attenuator reflects less than about 6% of said test beam.

5. The interferometer of claim 3 wherein said absorption by said pellicle is substantially homogeneous.

6. The interferometer of claim 1 wherein said pellicle has a thickness small enough that it introduces aberration of no more than approximately one-eighth of a wavelength into a wavefront of an F/1 beam passing through said pellicle.

7. The interferometer of claim 6 wherein said pellicle has a thickness of approximately two microns.

8. The interferometer of claim 1 wherein a dye of said pellicle is selected from the group consisting of nigrosines, indulines, acetate dyes, azo disperse dyes, anthraquinone disperse dyes, or diphenylamine disperse dyes.

9. The interferometer of claim 1, further comprising:
   (a) a first lens to focus said initial beam, thereby producing a first spherical wavefront;
   (b) a beamsplitting surface, which produces a second spherical wavefront from said first spherical wavefront.

10. A method for obtaining interference fringes, comprising the steps of:
   (a) producing an initial beam;
   (b) separating said initial beam into a reference beam and a test beam;
   (c) reflecting said test beam from a test element;
   (d) attenuating said test beam with a thin, optically uniform, absorbing attenuator located in said test beam so that the intensity of said attenuated test beam is approximately equal to the intensity of said reference beam, the attenuator reflecting less than approximately ten percent of said test beam, the method including dyeing said attenuator during manufacture thereof so that said attenuator reflects no more than about six percent of said test beam from said attenuator;
   (e) interfering said reference beam and said attenuated test beam to produce an interference fringe pattern.

11. The method of claim 10, wherein the step of separating said initial beam into a reference beam and a test beam is accomplished by means of a partially reflective and partially transmissive reference surface 74A which produces a reference beam by reflecting part of said initial beam and produces a test beam by transmitting part of said initial beam.

12. The method of claim 11 including the step of absorbing more than about sixty percent of said test beam, thereby reducing the intensity of said test beam to an intensity approximately equal to the intensity of said reference.

13. An attenuator comprising a planar film of uniform thickness supported on a planar frame, a dye material uniformly distributed in the film, the thickness of the film being less than a value of thickness at which the film would introduce aberrations of approximately one-fourth of the wavelength of a spherical wavefront of an F/1 beam passing through the film, the wavelength being in the range from approximately 0.3 to 1.0 microns, the dye causing the film to have absorptivity in the range of 50% to 80% and reflectivity of less than approximately ten percent.

14. An interferometer, comprising in combination:
   (a) means for producing an initial beam;
   (b) means for separating said initial beam into a reference beam and a test beam;
   (c) a test element which reflects said test beam;
   (d) a thin, absorbing attenuator located in said test beam, said attenuator reflecting less than about ten percent of said test beam and attenuating said test beam so that its intensity is approximately equal to the intensity of said reference beam, said attenuator including a pellicle composed of a polymer selected from the group consisting of cellulose nitrate, polyethylene, and polyvinylidene chloride;
   (e) means for interfering said reference beam and said attenuated test beam to produce a fringe pattern representing differences between said test beam and said reference beam.

* * * * *